United States Patent Office 3,429,841
Patented Feb. 25, 1969

3,429,841
PROTECTION OF PROPYLENE POLYMER FIBERS FROM DETERIORATION BY LIGHT
Mark W. Pollock, Teaneck, N.J., and Arthur C. Hecker, Forest Hills, N.Y., assignors to Argus Chemical Corporation, Brooklyn, N.Y., a corporation of New York
No Drawing. Filed Nov. 26, 1965, Ser. No. 510,058
U.S. Cl. 260—28　　　　　　　　　　　9 Claims
Int. Cl. C08f 45/58, 47/12

ABSTRACT OF THE DISCLOSURE

A stabilizer composition is provided for coating propylene polymer fibers to shield the fibers from light and containing a 2-hydroxybenzophenone and an oxidized polymeric wax to enhance the light absorbing protection afforded by the benzophenone and improve the adherence of the benzophenone to the fibers, and optionally, an epoxidized fatty acid ester and/or a cross-linking agent.

Propylene polymer fiber coated with such a stabilizer composition is also provided.

---

This invention relates to a process for protecting propylene polymer fibers against light-induced deterioration in physical properties, and to stabilizer compositions for use in this process, and to the propylene polymer fibers protected by said stabilizer compositions. More particularly, this invention relates to a process for shielding propylene polymer fibers from light tending to produce deterioration by application to the surface thereof of a 2-hydroxy-benzophenone, an oxidized polymeric wax and optionally an epoxidized fatty acid ester, to a surface coating composition for this purpose, and to the surface-coated propylene polymer fibers obtained thereby.

Propylene polymers in solid form or in the form of fibers, when exposed to light, particularly to ultraviolet light or sunlight, over long periods of time are subject to rapid deterioration in physical properties and especially to severe loss in tensile strength. In the theory that light absorbers that preferentially absorb such light before it can be absorbed by the polymer can protect the polymer, many different kinds of ultraviolet light absorbers have been incorporated directly into the propylene polymer. However, this technique has not been completely successful, especially in the case of fibers.

In many cases, only small quantities of ultraviolet absorbers are compatible with propylene polymers, and accordingly, only small quantities of the absorber can be incorporated in the polymer. Due to the large surface area of fibers, small amounts of stabilizer are quickly used up by absorption of ultraviolet radiation that penetrates the surface of the polymer, and thereafter deterioration of the polymer quickly results. On the other hand, absorber present in the interior might as well not be there, as the light is absorbed by and deteriorates the surface polymer before it can reach such absorber.

It has accordingly been proposed that organic polymeric structures be shielded from light tending to produce deterioration by coating an ultraviolet absorber on the surface of the polymer. The coating thus acts as a shield for the polymer beneath. U.S. Patent No. 2,568,894 to Mackey, dated Sept. 25, 1951, incorporates 4-benzoylresorcinol into carriers such as plastics, resins, waxes, paints and the like, in coatings on colored or uncolored textiles and fabrics, to protect them from degradation and discoloration. 4-benzoylresorcinol, as the patent states, mixes readily with any type of material, and can be applied to the surface of the materials to be protected from solutions in organic solvents, since it is readily soluble in all organic solvents, and also in the film forming material constituting the coating base. However, unfortunately, 4-benzoylresorcinol is not as effective as later-developed absorbers, such as the 2-hydroxy-benzophenones, and it turns dark on ageing and upon exposure to light, which limits its scope of application.

U.S. Patent No. 2,790,734 to Kuhn et al., dated Apr. 30, 1957, coats nylon thread or fabric with a copper salt of an organic carboxylic acid, which renders the nylon stable to the deteriorating effects of direct sunlight or ultraviolet sources.

This coating procedure, as in the case of most synthetic polymeric fibers, encounters an adherence problem, which Kuhn et al. resolve by using the stabilizer with a resinous binder which is capable of being hardened and adheres thereafter to nylon. This stabilizer is, of course, useful with nylon, but it is not useful with olefin polymers such as polypropylene.

The adherence problem in coating polymeric fibers is well discussed in U.S. Patent No. 3,043,709 to Amborski, dated July 10, 1962. Amborski states that "connecting the screening agent or absorber on the surface of the structure as in the second method, the coating method offers much more effective protection. However, difficulties are usually encountered in adhering the coatings to the surface of the structure. The coatings may not adhere well, or if they do adhere, they often cannot be applied without forming streaks. Furthermore, the coating, which usually contains a polymeric material, may also tend to be degraded by ultraviolet light and peel from the base structure." These difficulties Amborski resolves by incorporating ultraviolet absorbent compounds into the polymeric structure so that the compounds are concentrated uniformly at the surface of the structure and are firmly attached to the structure, and then heating the structure to a temperature above the melting point of the ultraviolet light absorbent compound and below the melting point of the base structure. This process, of course, is difficult if not impossible of application to fibers, and in fact, although he speaks of fibers, Amborski shows application of the process only to films.

Hardy et al., U.S. Patent No. 2,976,259, dated Mar. 21, 1961, suggested the use of 2-hydroxy-benzophenones prior to Amborski, and used the coating technique which Amborski noted as defective for the protection of dyed fabrics to protect the dyes from fading. The type of fiber of which the fabric was made is not stated, but if it were a synthetic polymer, Hardy undoubtedly encountered the adherence problem discussed by Amborski.

It is, of course, apparent that in the case of fibers particularly, a permanently adherent type of coating is not an optimum solution of the problem. When the stabilizer becomes depleted, as it must, it should be renewable, and the old coating should be removable. Thus, the Amborski solution of the adherence problem of Hardy is not really applicable to fibers, from the practical standpoint.

In accordance with this invention, a process is provided for shielding propylene polymer fiber from light tending to produce deterioration, by coating the fiber with a stabilizer composition which adheres well to the surface of the fiber, although not melted into or chemically bonded thereto, and is not readily removed therefrom by washing or dry cleaning. The stabilizer coating of the invention absorbs ultraviolet radiation before it can reach the propylene polymer fiber, and thus effectively shields the fiber from such radiation. The stabilizer which is depleted by the ultraviolet radiation is readily replenished by recoating propylene polymer fiber therewith and thus protection can be renewed at as frequent intervals as may be required. For example, the coating compositions can be renewed by dry cleaning and laundry establishments in periodic cleanings.

Propylene polymer fiber coated with the light stabilizer compositions of the invention is more effectively protected against light-induced deterioration than if such fiber contained light stabilizers incorporated therein. The problem of compatibility of stabilizer composition and polymer is not present where the stabilizer composition is applied as a coating on the fiber, as opposed to being incorporated directly into the fiber. Accordingly, more protection for the propylene polymer fiber can be obtained by using a concentrated stabilizer composition in the form of a coating than by incorporating the stabilizer directly into the polymer. Furthermore, the use of a stabilizer coating for propylene polymer fiber is far less wasteful, since much of the stabilizer distributed within the polymer is never used, because the harmful radiation is absorbed by and deteriorates the polymer before it reaches the stabilizer.

The light-stabilizing propylene polymer composition of the invention comprises a 2-hydroxy-benzophenone and an oxidized polymeric wax. The 2-hydroxy-benzophenone is the light stabilizer and the oxidized polymeric wax serves as a carrier for the benzophenone, aiding in adhering it to the fiber surface and serving as a film-forming agent to distribute it over the surface of the fiber as a light-shielding film.

The process of the invention comprises coating propylene polymer fiber with the stabilizer composition which comprises a 2-hydroxy-benzophenone, and an oxidized polymeric wax.

The oxidized wax, although not itself a stabilizer, unexpectedly has been found to enhance the effectiveness of the 2-hydroxy-benzophenone in preventing deterioration of the propylene polymer fiber upon exposure to light. Optionally, an epoxidized fatty acid ester can be added to the above stabilizer composition, to further enhance the effectiveness of the 2-hydroxy-benzophenone-oxidized polymeric wax combination, in preventing light-induced deterioration of the propylene polymer fiber. The above two- or three-component combinations are more effective than any of the components alone, suggesting that the wax and fatty acid ester components synergize the light stabilizing effectiveness of the benzophenone.

The stabilizer coating compositions of the invention can be applied as a coating on the propylene polymer fiber from aqueous emulsions of the components of the composition. The components can be formulated as simple mixtures in the aqueous emulsions. The aqueous emulsions can be prepared by melting together the ingredients, the 2-hydroxy-benzophenone, the oxidized polymeric wax, and optionally, the epoxidized fatty acid ester, at a temperature above the melting point of the oxidized polymeric wax, and then mixing such hot melts with water and a suitable emulsifying agent.

The process and stabilizer coating compositions of the invention are applicable to propylene polymer fiber in any form, such as monofilaments, linters, roving, sliver, yarn, felts, warps, sheets, non-woven bats, and woven, non-woven, and knitted textile fabrics of all sorts.

The benzophenones used in the stabilizer coating combination of the invention have a 2-hydroxy-benzophenone nucleus, i.e., a nucleus of the structure

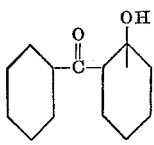

This nucleus is inclusive of the compound 2-hydroxy-benzophenone and derivatives thereof bearing substituent groups attached to any of the ring carbon atoms of the nucleus. The preferred benzophenones of the invention, containing a nucleus of the above structure, have the following general formula:

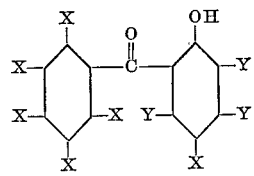

wherein the X-radicals are selected from the group consisting of hydrogen, hydroxyl, halogen (such as fluorine, chlorine, bromine and iodine, and preferably chlorine or bromine), nitro and R-radicals of from one to about thirty carbon atoms; wherein the Y-radicals are selected from the group consisting of hydrogen, hydroxyl, halogen (such as fluorine, chlorine, bromine and iodine, and preferably chlorine or bromine), and R-radicals of from one to about thirty carbon atoms.

Within the above limitations, the X- and Y-radicals substituted on any ring or on different rings can be the same or different. That is, for instance, the para Y-radical can be an R-radical; while one ortho Y-radical can be the same or a different R-radical and the other ortho Y-radical can be a halogen; and the two meta Y-radicals can be hydrogen. The X-radical on the other ring can be an R-radical, or a different radical; and if an R-radical they can be the same, or different, from any Y-radicals which are R-radicals. Other combinations will be apparent to those skilled in the art.

The R-radical is an organic radical and can be selected from the group consisting of aliphatic aryl, alkaryl, aryloxy, alkaryloxy, alicyclic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aralkyl, alkoxy, aralkoxy, oxyalkylene, hydroxylalkyl, and hydroxyalkylene radicals, and esters thereof with organic carboxylic acids. These R-radicals may, if desired, contain inert, nonreactive substituents such as halogen and other carbocyclic and heterocyclic ring structures.

Typical R-radicals are, for example, methyl, ethyl, propyl, isopropyl, butyl, isobutyl, t-butyl, amyl, isoamyl, n-octyl, isoctyl, 2-ethylhexyl, t-octyl, decyl, ethylnonyl, ethylmethyloctyl, diethylheptyl, undecyl, dodecyl, pentadecyl, octadecyl, tricosyl, and nonacosyl; allyl, hexenyl, linoleyl, ricinolyl, oleyl, undecadienyl, propyloctadecenyl, propynyl, methoxy, n-butoxy, n-octyloxy, 2-ethylhexyloxy, n-decyloxy, benzyloxy, acetoxy, benzoyloxy; hexynyl, ethylheptadecadiynyl, undecynyl; monochloroethyl, polychloroethyl, monobromopropyl, polybromopropyl, fluoroheptyl, chlorododecyl, chlorododecenyl, chlorododecynyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxyundecynyl, glyceryl, sorbityl, pentaerythrityl, and polyoxylkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. Exemplary of such acids are acetic, propionic, butyric, valeric, hexanoic, ethylheptanoic, n-octanoic, iso-octanoic, capric, undecanoic, lauric, myristic, palmitic, stearic, oleic, ricinoleic, behenic; chlorocaproic and hydroxycapric acids.

As typical examples of benzophenones that are intended to be included within the scope of this invention may be mentioned the following:

2-hydroxy-benzophenone,
2-hydroxy-4-bromo-benzophenone,
2-hydroxy-4-methyl-benzophenone,
2-hydroxy-4-iodo-benzophenone,
2-hydroxy-4-pentachloro-benzophenone,
2-hydroxy-4-decyloxy-benzophenone,
2-hydroxy-4-benzyloxy-benzophenone,
2-hydroxy-4,5-dimethyl-benzophenone,
2-hydroxy-4-benzyloxy-5-chlorobenzophenone,
2-hydroxy-5-hexyl-2′,4′-dimethyl-benzophenone,
2-hydroxy-4-(3,4-dichlorobenzyloxy)-4′-t-butylbenzophenone,
2-hydroxy-3-methyl-4′-nitrobenzophenone,
2-hydroxy-4-hexyl-benzophenone,
2-hydroxy-4-benbzyloxy-2′,4′,5′trichlorobenzophenone,
2-hydroxy-4-ethyl-3′-chloro-benzophenone,
2,4-dihydroxybenzophenone,
2,2′,4-trihydroxybenzophenone and
4-n-decyloxy-2,2′-dihydroxybenzophenone.

The oxidized polymeric wax should have a molecular weight of at least 750. The acid number of the oxidized wax is not critical, and can range from about 2 to about 50. If acidity of the finish is a problem, an alkaline material can be incorporated in the composition in sufficient amount to reduce the acidity to within acceptable limits. Suitable alkaline materials include alkali metal hydroxides such as sodium hydroxide and potassium hydroxide, and aliphatic amines such as butyl amine, strongly basic alkanol amines such as diethanolamine, monoethanolamine and triethanolamine, and alkaline inorganic salts such as borax, disodium phosphate and sodium carbonate. Usually, the amount of alkaline material is sufficient to reduce the acidity to the desired level.

The polymeric wax should be a solid material at the temperatures of use of the propylene polymer fiber. In general, it is preferred that the polymeric wax have a melting point of at least about 60° C., up to about 150° C. There is no critical upper limit of melting point, since the wax can be applied from a solution or dispersion.

Typical oxidized polymeric waxes which are effective in the invention are oxidized polyolefins of the emulsifiable type, both of low and high viscosities, and low and high densities, such as oxidized polyethylene, oxidized polypropylene, and oxidized polybutene, Fischer-Tropsch wax (such as an oxidized Fischer-Tropsch hydrocarbon wax mixture having an acid number of 5 to 40), and oxidized microcrystalline wax.

The oxidized waxes are definitely not equivalent to the non-oxidized waxes. The former are easily emuslified with the other components of the stabilizer combination of this invention. The non-oxidized waxes have been found to be incapable of forming a homogeneous emulsion with the other components of the stabilizer combination of this invention and thus cannot be used herein.

The epoxidized fatty acid esters used in the instant invention can be defined as having at least one epoxy group, and can have from about 10 to about 150 carbon atoms. Typical of such epoxy compounds are epoxidized glyceryl monostearate, epoxidized glyceryl dierucate, epoxidized soyabean oil, epoxidized codliver oil, epoxidized linseed oil, epoxidized castor oil, epoxidized perilla oil, epoxidized corn oil, epoxidized cottonseed oil, epoxidized sunflower oil, epoxidized safflower oil, epoxidized sesame seed oil, epoxidized walnut oil, epoxidized peanut oil, epoxidized olive oil, epoxidized rape seed oil, epoxidized whale oil, epoxidized coconut oil and epoxidized tallow.

Exemplary of other esters suitable for use herein are esters of epoxidized acids such as epoxy oleic, epoxy linoleic, epoxy erucic, epoxy ricinoleic, epoxy crotonic, epoxy isocrotonic, and epoxy brassidic acids esterified with organic monohydric or polyhydric alcohols. Typical monohydric alcohols include butyl alcohol, 2-ethylhexyl alcohol, lauryl alcohol, isooctyl alcohol, stearyl alcohol, ricinoleyl alcohol, and oleyl alcohol. Typical polyhydric alcohols include pentaerythritol, glycerol, ethylene glycol, 1,2-propylene glycol, 1,4-butylene glycol, neopentyl glycol, erythritol, mannitol, and sorbitol.

Preferably, the stabilizer coating composition comprises from about 5 to about 50% by weight of the 2-hydroxybenzophenone, and from about 25 to about 95% by weight of the oxidized polymeric wax and from about 25 to about 47.5% by weight of the epoxidized fatty acid ester, when present.

Propylene polymer fiber coated with the stabilizer composition of the instant invention preferably should carry a coating within the range from about 0.1 to about 3% by weight based on the weight of the fiber coated.

Coating compositions of the invention are best formulated as oil-in-water emulsions, although water-in-oil emulsions may have applicability for special situations. Any emulsifying agents ordinarily incorporated in fibrous finishing compositions can be employed in preparing such emulsions.

The nonionic emulsifying agents are a preferred class because they do not impart an acidity or basicity which must be controlled by addition of alkaline or acidic buffers.

One class of emulsifiers are the polyoxyethylene ethers and esters of hydrocarbon acids and alcohols, such as aryl and alkyl oxyethers and esters and thioethers and thioesters have the following general formula:

$$R-A-(CH_2CH_2O)_x-CH_2CH_2OH$$

where R is a straight or branched chain saturated or unsaturated hydrocarbon group having from eight to eighteen carbon atoms or an alkylaryl group having a straight or branched chain saturated or unsaturated hydrocarbon group of from eight to eighteen carbon atoms attached to the aryl nucleus, and attached to A through the aryl nucleus. A is selected from the group consisting of ethereal oxygen and sulfur, carboxylic ester and thiocarboxylic ester groups, and x is a number from 8 to 20. R can, for example, be a straight or branched chain octyl, nonyl, decyl, lauryl, myristyl, cetyl or stearyl group, or an alkylaryl group such as octylphenyl, nonylphenyl, decylphenyl, stearylphenyl, etc.

When R is alkyl it will be evident that the emulsifier can be regarded as derived from an alcohol, mercaptan, oxy or thio fatty acid of high molecular weight, by condensation with ethylene oxide. Typical of this class of alkyl ether are the condensation products of oleyl or dodecyl alcohol or mercaptan with from 8 to 17 moles of ethylene oxide, such as "Emulphor ON," "Nonic 218" and "Sterox SE" and "SK." Typical alkyl esters are "G1226," "Renex" (polyoxyethylene esters of tall oil acids), "Sterox CD" and "Neutronyx 330" and "331" (higher fatty acid esters of polyethylene glycol).

When R is alkaryl, the emulsifier can be derived from an alkyl phenol or thiophenol.

The ethoxylated alkyl phenols and thiophenols have the following general formula:

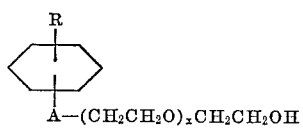

where R is a straight or branched chain saturated or unsaturated hydrocarbon group having at least eight carbon atoms up to approximately eighteen carbon atoms, A is oxygen or sulfur and $x$ is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the trade names "NIW," "Antarox A–400," "Igepal CA" and "CO," "Triton X–100," "Neutronyl 600," and "Tergitol NFX."

Other classes of emulsifiers are the "Pluronics," polyoxypropylene polyoxyethylene condensates, such as "Pluronic L–44," described in U.S. Patents No. 2,674,619 and 2,677,700.

The aliphatic fatty acid partial esters of hexitols such as sorbitol and mannitol and their anhydrides are a particularly desirable class of emulsifiers. Typical are sorbitan monooleate, sorbitan monostearate, and sorbitan monopalmitate.

The polyoxyalkylene glycol ethers of such esters also are useful. These have one or more of the free hydroxyls etherified with an average of one to twenty oxyalkylene glycol units, such as sorbitan monooleate polyoxyethylene glycol and sorbitan monopalmitate polyoxyethylene glycol.

Diethanolamine-fatty acid condensates can be used, such as Alrosol. Also useful are the partial glycerol esters of fatty acids such as stearic acid, palmitic acid and myristic acid and the alkali metal and amine or ammonia salts of such acids, of petroleum sulfonates, of alkyl aryl sulfonates such as sodium dodecyl benzene sulfonate, and sodium keryl benzene sulfonate, and of long chain alkyl sulfates such as sodium lauryl sulfate and sodium oleyl sulfate.

The amount of emulsifying agent will depend upon that required to produce a stable dispersion or solution of the stabilizer composition in the suspending medium. The amount is in no way critical, and is readily determined. Usually, the amount will be within the range from about 0.1 to about 50% by weight of the polymeric wax and benzophenone in the stabilizer composition.

The coatings obtained from compositions as described above are reasonably durable, and will withstand one or more launderings or drycleanings, depending upon the thickness of the coating deposited. Such coatings are easily removed when they have been worn off, and residual coatings can be removed prior to removal by scouring or repeated cleanings.

The good durability of the stabilizer coating of the invention can be enhanced and in addition in some cases coupled with a degree of creaseproofing by including in the composition of the invention a cross-linking agent which aids in bonding the oxidized polymeric wax and benzophenone to the fiber. By the term "cross-linking agent" is meant any polyfunctional chemical compound capable of resin-forming polymerization and of reaction with benzophenones, carboxylic acids, and active hydrogen groups in the fiber. Effective cross-linking agents are aldehydes and materials which liberate or contain aldehydes. Typical aldehydes are formaldehyde, paraformaldehyde, dialdehyde starch, dialdehyde cellulose, hexamethylene tetramine, acrolein, glycidaldehyde, methacrolein, glyoxal, hexanedial-1,3, and propanedial-1,3, and their acetals.

Also useful cross-linking agents are the epoxy resin-forming materials such as the polyglycidyl ethers of polyols, for example, diglycidyl ether of butanediol, triglycidyl ether of glycerol, tetraglycidyl ether of pentaerythritol, diglycidyl ether of Bisphenol A, diglycidyl ether of diphenolic acids, such as $\gamma,\gamma$-bis(p-hydroxyphenyl) valeric acid, vinyl cyclohexene dioxide, epoxidized rubbers, glycidyl methacrylate and its polymers and copolymers; also, tris-(aziridinyl) phosphine oxide, and tetra-(hydroxymethyl) phosphonium chloride.

Aldehyde-containing materials useful as cross-linking agents include aldehyde-amine resins in the water-dispersible stage of polymerization. Preferred materials of this type are prepared by reacting from 0.5 to 1 mole of aldehyde for each active NH- group on the amine. Specific examples include dimethylol urea, poly(oxymethyl) ureas, e.g., bis-(methoxymethyl) uron (see U.S. Patent 2,370,839); bis-(hydroxymethyl)-ethylene urea; tetra-(hydroxymethyl) - acetylene diurea; tetra - (methoxymethyl)-acetylene diurea; bis-(hydroxymethyl)-ethylene thiourea; bis-(methoxymethyl)-ethylene urea; 1,3-bis-(hydroxymethyl)-5-hydroxyethyl tetrahydrotriazone (see U.S. Patent No. 2,304,624); hexamethylol melamine; tri-(methoxymethyl)-melamine; polymethylol triazines, such as trimethylol acetoguanamine and tri-(methoxy methyl) benzoguanamine and water-soluble polymers thereof, including crude reaction products of commerce which contain the indicated monomers or polymers thereof.

As examples of commercial materials of this class of materials are the urea-formaldehyde resin, e.g., "Rhonite 313 or 480"; methoxy methyl urea resin, e.g., "Rhonite R–2"; methylated polymethylol melamines, e.g., "Aerotex M–3" and "Resloom M–75"; dimethylol ethylene urea resin, e.g., "Rhonite R–1"; bis-(methoxymethyl) uron, e.g., "Prym A"; and tetramethylol acetylene diurea, e.g., "CET."

Another type of water-dispersible thermosetting aldehyde resin which may be used is the phenolic-aldehyde resins. Suitable reactive phenolic resins are those formed by alkaline condensation of formaldehyde and phenol in a ratio of about 1.1 to about 3 moles of formaldehyde per mole of phenol, with the reaction being arrested while the resin is still in the formative stage. Such resins can be formed from substituted phenols such as resorcinol and o-cresol and with other aldehydes and formaldehydes, e.g., acetaldehyde, furfuraldehyde and the like. Specific examples of such phenolic resins are the "Durez" resins, e.g., "Durez 14798." Additional examples of suitable water-dispersible phenolic resins are those disclosed in U.S. Patent No. 2,457,493.

The amount of cross-linking agent employed will depend upon the effect desired. Very small amounts may considerably improve the durability of the coating. Larger amounts in proportion to the stabilizer composition may impart a creaseproofing effect. Excellent results can be obtained employing application media containing from 1 to 200% by weight of the wax and benzophenone of a cross-linking agent, but the stabilizer composition will of course be present in an amount to shield the fiber from harmful radiation. The cross-linking agent is preferably present in an equal proportion to the combined weight of the polymeric wax and benzophenone with or without the epoxidized fatty acid esters.

To accelerate the rate of cure and ensure completion of the cure of the cross-linking agent, a curing catalyst can be included. Catalysts for these curing agents are well known, and any such catalysts which are acidic or latently acidic can be used. Acidic and latently acidic salts such as ammonium salts and amine hydrohalide salts are typical.

The compositions composed of the oxidized polymeric wax and benzophenone can be marketed as such for use in the preparation of application media, which are described in detail later. Such compositions can also be formulated with one or more cross-linking agents in the desired proportion to the wax-benzophenone mixture for production of the application medium upon dilution with the dispersing liquid. It is convenient in many cases to prepare such compositions in the form of concentrated emulsions or solutions which are readily diluted with water or other solvents at the time of application. Such compositions are referred to herein as concentrates, inasmuch as they are ordinarily applied only after dilution at a considerably lower concentration of the active components.

In addition to these materials, the concentrates and/or application media of the invention may contain standard propylene polymer treating adjuncts, including, for example, oil-repellent finishes such as the perfluorocarbon acid Werner complexes, such as those disclosed in U.S. Patent No. 2,662,835, and perfluoroacrylate polymers and copolymers, dyes, and pigments, textile lubricants, heat-stabilizer agents, flame-proofing agents, shrink-proofing agents, brightening agents, sizes, mildew-proofing agents, and softening agents. Materials in these groups are well known to those skilled in the art, and would be employed to obtain the special effect indicated by the function of the agent. Alternatively, such materials can be applied to the propylene polymer fiber either before or after application of the stabilizer composition.

The application media in accordance with the invention can be applied to propylene polymer fibers using conventional equipment. Standard impregnating, padding, and like treating apparatus can be employed. Usually, it is convenient to apply the compositions by dipping, padding or immersing. Brushing, spraying, roller coating, electrostatic coating, doctor-blade coating and like procedures can also be employed. The equipment will be set to give the desired weight of composition per unit area or volume of the base material. The wet pickup will, of course, be adjusted to take into account the concentration of solid materials in the application media. The concentration of solids will in turn depend upon the viscosity required for the equipment used, and if necessary, viscosity increasing agents such as water-soluble cellulose ethers may be employed to limit impregnation of the propylene polymer fiber by the application medium. Usually, application media containing from 1 to 30% by weight of solid materials are employed and the wet pick-up is controlled to provide up to about 5% solids, on the treated material.

Following application of the composition, the propylene polymer fiber may be dried to remove suspending liquids. The temperatures and heating times employed are so adjusted as to avoid decomposition or damage either to the coating or to the propylene polymer fiber.

The stabilizer of the invention is applicable to various types of propylene polymer fiber.

Isotactic polypropylene, available commercially under the trademarks Profax, Escon and Olefane, having a softening or hot-working temperature of about 350° F. is an example of a sterically regular propylene polymer which can be used herein.

Polypropylene solid polymer can be defined in a manner to differentiate it from other polyolefins as having a density within the range of from 0.86 to 0.91, and a melting point above 150° C.

Fibers comprising mixtures of olefin polymers, such as propylene polymers with other compatible polymers and copolymers of propylene with copolymerizable monomers, such as ethylene and butene, also can be protected from light induced deterioration in accordance with this invention. For example, mixtures of polyethylene fiber, and fibers of copolymers of propylene and ethylene which contain a sufficient amount of propylene to present the instability problem that is resolved by the stabilizer coating of the invention, can be shielded from harmful light by the coating thereon of the instant propylene polymer stabilizers. The term "propylene polymer" as used herein accordingly includes homopolymers such as polypropylene, and propylene copolymers, and mixtures of propylene polymers, as discussed above.

The following examples in the opinion of the inventors represent the best embodiments of their invention.

EXAMPLE 1

A hot-melt stabilizer blend was prepared by melting together 15 parts of AC Polyethylene 629 (an oxidized waxlike polymer, molecular weight about 2000, emulsifiable grade, melting point 213 to 221° F., acid No. 14 to 17), 15 parts of 2-hydroxy-4-decyloxy-benzophenone, and an emulsifier comprising 3.7% polyoxyethylene sorbitan palmitate, 2.0% sorbitan mono-oleate, 0.7% borax and 93.6% water. The ingredients were charged into a heated mixing vessel, heated to 220° F. and then agitated vigorously until homogeneous and clear.

In a separate heated mixing vessel equipped with a propeller-type agitator, water was heated to 210° F. The water was added to the hot-melt blend, prepared as set forth with good agitation, forming an oil-in-water emulsion. After all of the water had been added, the rate of stirring was reduced, and continued until the emulsion had cooled to room temperature. The resulting emulsion was milky and completely fluid, and contained about 63.6 parts water and about 36.4 parts of the hot melt blend, with a slightly off-white color. The pH of the emulsion was 8.3. The emulsion was stable, showed no sign of separation after standing at room temperature for seven days, and could be diluted with cold water without coagulation.

About 3.3 parts of this emulsion was applied to a polypropylene fabric as follows. A textile padding bath was prepared by mixing 3.3 parts of this emulsion with 96.7 parts of water. Polypropylene fiber yarns were padded with this bath to a wet pick-up of about 80%, framed, air-dried and cured for five minutes at 250° F. The resulting yarns thus were coated with a waxy polyethylene coating, containing approximately 0.4% 2-hydroxy-4-decyloxybenzophenone, and had substantially the same color, hand, porosity and appearance as the untreated yarns. As a first control, 3.3 parts of an emulsion containing 30% oxidized polyethylene wax and no benzophenone was applied to the polyethylene fabric as described above.

The treated fabrics and a second control fabric of untreated yarns were placed in a Weather-O-Meter for periods of from 100 hours up to 600 hours. One batch of yarns from the fabric was tested for tensile strength using an Instron Tensile Tester. Another part of each fabric was dry cleaned, and then tested for tensile strength as before. Still another portion of each fabric was laundered a total of five times, using each time the full wash and rinse cycles in an automatic home washer type machine, with 50 g. of "Tide" washing detergent, followed by drying for ten minutes at 160° F. and then, the yarns were tested for tensile strength.

As a third control, a 5% solution of 2-hydroxy-4-decyloxybenzophenone in mineral spirits was applied by padding to unfinished polypropylene fabric so that the yarns carried a coating of about 0.5% by weight 2-hydroxy-4-decyloxybenzophenone. These fabrics were placed in the Weather-O-Meter (fadeometer) for periods from 100 to 600 hours. As before, one batch of yarns was tested for tensile strength, another batch after dry cleaning of the fabric was tested for tensile strength, and still another batch taken from fabric that had undergone five home washes was tested for tensile strength.

The tensile strength data of the wax-coated yarns (Control 1), the unfinished yarns (Control 2), yarns having a coating of 2-hydroxy-4-decyloxybenzophenone applied to the yarns using a solvent (Control 3), and yarns having a coating of 2-hydroxy-4-decyloxybenzophenone and oxidized polyethylene applied by padding in accordance with the invention (Example 1) are set forth in Table I below.

TABLE I

| Type of Cleaning | Time in Weather-O-Meter (hours) | Tensile Strength Data for Polypropylene Fiber (g./cm.²) | | | |
|---|---|---|---|---|---|
| | | Control 1 | Control 2 | Control 3 | Example 1 |
| | | Coating of wax, no benzophenone in coating | No light stabilizer coating | Coating of 2-hydroxy-4-decyloxybenzophenone, no wax | |
| No Cleaning | 0 | 1,710 | 1,800 | 1,510 | 1,800 |
| | 100 | 900 | 1,090 | 1,010 | 1,090 |
| | 400 | 0 | 0 | 610 | 910 |
| | 600 | | | | 750 |
| Dry Clean | 0 | 1,700 | 1,650 | 1,550 | 1,570 |
| | 100 | 750 | 780 | 690 | 1,110 |
| | 200 | 0 | 0 | 0 | 220 |
| | 300 | 0 | 0 | 0 | 0 |
| Five Home Washes | 0 | 1,300 | 1,270 | 1,300 | 1,350 |
| | 100 | 210 | 210 | 265 | 1,020 |
| | 200 | 0 | 0 | 0 | 650 |
| | 300 | 0 | 0 | 0 | 210 |

It is evident from the above tensile data that the yarns of Example 1, after exposure to light of the fadeometer carrying the wax-benzophenone stabilizer coating of the invention, retained greater tensile strength both before and after dry cleaning, and after five home washes, than the wax-coated yarns of Control 1, the unfinished yarns of Control 2, and the 2-hydroxy-4-decyloxybenzophenone coated yarns of Control 3. Accordingly, the stabilizer coating of the invention effectively shielded the polypropylene fabric from light which produces deterioration in tensile strength.

EXAMPLES 2 to 5

An oil-in-water emulsion was prepared by the procedure of Example 1, containing 7.5 parts of the oxidized polyethylene and 7.5 parts of epoxidized soyabean oil, and 15 parts of 2-hydroxy-4-decyloxybenzophenone.

A polypropylene padding bath was prepared from this emulsion as in Example 1. Various amounts of this emulsion were then applied to polypropylene yarns to produce yarns having the following coatings or finishes:

| Example Number | Amount in Coating on Yarn (Percent by Weight of Yarn) | | |
|---|---|---|---|
| | 2-hydroxy-4-decyloxybenzophenone | Oxidized polyethylene | Epoxidized soybean oil |
| 2 | 0.1 | 0.05 | 0.05 |
| 3 | 0.25 | 0.125 | 0.125 |
| 4 | 0.5 | 0.25 | 0.25 |
| 5 | 0.75 | 0.375 | 0.375 |
| Control 4 | | 2.0 | 2.0 |

In the manner described in Example 1, the yarns were tested for tensile strength after being exposed in a Weather-O-Meter for various periods of time with no cleaning, after dry cleaning, or after five home washes. The tensile data is given in Table II below.

In comparing the results reported in Table II with those of Table I, it is clearly seen that the epoxidized soyabean oil enhanced the effectiveness of the 2-hydroxy-4-decyloxy benzophenone and oxidized polyethylene combination in protecting the polypropylene from deterioration in tensile strength on exposure to light. Furthermore, it is seen from the results in Control 4 that a coating containing only oxidized polyethylene and epoxidized soyabean oil was not effective in shielding the fabric from light which produced deterioration.

The following controls, Controls 5 and 6, were carried out in order to show the lack of any effect of the stabilizer combination of the invention on nylon. A portion of the oil-in-water emulsion was used in preparing a nylon padding bath by mixing 6.6 parts of this emulsion with 93.4 parts of water. Nylon taffeta was padded with this bath to a wet pickup of about 50%, framed, air-dried and cured for ten minutes at 275° F. The composition of the dry add-on comprised about 0.5% 2-hydroxy-4-decyloxy benzophenone, about 0.25% oxidized polyethylene and about 0.25% epoxidized soyabean oil, based on the weight of the nylon taffeta.

In Control 5, one inch ravelled strips of the so-treated nylon taffeta were tested for their tensile strength using a Scott Tear Tensile Tester, and were found to have a tensile strength of 83 pounds per square inch (p.s.i.). After being placed in a Weather-O-Meter for 100 hours, the nylon taffeta strips were found to have a tensile strength of less than 15 p.s.i.

In Control 6, one inch strips of ravelled untreated nylon taffeta were tested for their tensile strength which was found to be about 82 p.s.i. After 100 hours in the Weather-O-Meter, the tensile strength of the untreated nylon was found to be less than 15 p.s.i. Thus, the tensile test results were substantially the same for both the treated and untreated nylon samples.

TABLE II

| Type of Cleaning | Time in Weather-O-Meter (hours) | Tensile Strength Data for Polypropylene Fiber Containing Various Coatings or Finishes (grams per square centimeter) | | | | |
|---|---|---|---|---|---|---|
| | | Example 2 | Example 3 | Example 4 | Example 5 | Control 4[1] |
| No cleaning | 0 | 1,710 | 1,490 | ---- | 1,730 | 1,400 |
| | 100 | 1,620 | 1,400 | 1,530 | 1,540 | 550 |
| | 300 | 1,340 | 1,180 | 1,150 | ---- | 0 |
| | 400 | 1,290 | 950 | 1,120 | 1,300 | ---- |
| | 600 | 0 | 0 | 840 | 925 | ---- |
| Dry Clean | 0 | 1,625 | 1,430 | 1,395 | 1,715 | ---- |
| | 100 | 1,090 | 1,430 | 1,280 | 1,670 | ---- |
| | 200 | 220 | 375 | 285 | 575 | ---- |
| | 300 | 0 | 0 | 0 | 0 | ---- |
| Five Home Washes | 0 | ---- | 1,315 | 1,490 | ---- | ---- |
| | 100 | 1,360 | 1,020 | 1,280 | 1,220 | ---- |
| | 200 | 985 | 695 | 730 | 960 | ---- |
| | 300 | 155 | 80 | 740 | 925 | ---- |

[1] Coating of wax and epoxidized soyabean oil; no 2-hydroxy-4-decyloxy benzophenone.

Accordingly, it is clearly seen from the above tensile test results that the stabilizer composition of this invention was not effective in protecting nylon from the deteriorative effects of light.

Having regard to the foregoing disclosure, the following is claimed as the inventive and patentable embodiments thereof:

1. A propylene polymer fiber having a coating which shields the fiber from light tending to produce deterioration in physical properties and consisting essentially of a 2-hydroxy-benzophenone in an amount to impart light absorbing protection, and an oxidized polymeric wax having a molecular weight above about 750, in an amount to enhance the light-absorbing protection afforded by the benzophenone, and to improve adherence of the benzophenone to the fibers.

2. A propylene polymer fiber in accordance with claim 1, wherein the coating includes an epoxidized fatty acid ester.

3. A propylene polymer fiber in accordance with claim 1, wherein the coating includes a polymeric cross-linking agent selected from the group consisting of aldehyde compounds and resins, acetals, polyamines, polyamides, epoxy-containing compounds, and phosphine and phosphonium compounds in an amount to improve the durability of the coating obtainable therefrom.

4. A propylene polymer fiber in accordance with claim 1, wherein the propylene polymer is polypropylene.

5. A propylene polymer fiber in accordance with claim 1 wherein the 2-hydroxybenzophenone is present in an amount of from about 5 to about 50% by weight and the oxidized polymeric wax is present in an amount of from about 25 to about 95% by weight.

6. A propylene polymer fiber in accordance with claim 3, wherein the coating includes an epoxidized fatty acid ester.

7. A propylene polymer fiber in accordance with claim 1, wherein the 2-hydroxybenzophenone is a 2-hydroxy-4-alkoxy-benzophenone, the alkoxy group containing from about eight to about eighteen carbon atoms.

8. A propylene polymer fiber in accordance with claim 1, wherein the 2-hydroxybenzophenone is 2-hydroxy-4-decyloxy-benzophenone.

9. A propylene polymer fiber in accordance with claim 1, wherein the oxidized wax is oxidized polyethylene.

References Cited

UNITED STATES PATENTS

| | | | |
|---|---|---|---|
| 2,951,052 | 8/1960 | Darby | 260—45.95 |
| 2,976,259 | 3/1961 | Hardy et al. | 260—45.95 |
| 3,006,887 | 10/1961 | Schoepfle et al. | 260—45.95 |
| 3,043,709 | 7/1962 | Amborski | 260—45.95 |
| 3,180,750 | 4/1965 | Shippee et al. | 260—28 |
| 3,243,310 | 3/1966 | Hull et al. | 106—270 |
| 3,249,565 | 5/1966 | Robitschek | 260—45.95 |
| 3,290,166 | 12/1966 | Sharp et al. | 117—138.8 |

MORRIS LIEBMAN, *Primary Examiner.*

H. S. KAPLAN, *Assistant Examiner.*

U.S. Cl. X.R.

106—270, 271; 117—138.8; 260—45.95, 23, 18